United States Patent [19]

Cochran et al.

[11] 4,236,422
[45] Dec. 2, 1980

[54] FLUID PUMP CONTROL SYSTEM FOR A TRACTOR

[75] Inventors: Gary L. Cochran; Charles D. Wilson; Maurice Klee, all of Burlington, Iowa

[73] Assignee: J. I. Case Company, Racine, Wis.

[21] Appl. No.: 62,639

[22] Filed: Aug. 1, 1979

Related U.S. Application Data

[63] Continuation of Ser. No. 860,151, Dec. 14, 1977, abandoned.

[51] Int. Cl.³ .............................................. G05G 1/00
[52] U.S. Cl. ........................................ 74/470; 60/469; 74/501 R; 417/222
[58] Field of Search .............. 74/501 R, 501.5 R, 479, 74/480 R, 470; 60/469, 487; 417/222

[56] References Cited

U.S. PATENT DOCUMENTS

| | | | |
|---|---|---|---|
| 2,424,198 | 7/1947 | Tauscher | 74/501.5 R |
| 2,515,274 | 7/1950 | Stevenson | 74/501.5 R |
| 2,921,481 | 1/1960 | Phelan | 74/501.5 R |
| 3,016,760 | 1/1962 | Wrighton et al. | 74/501.5 R |
| 3,188,878 | 6/1965 | Chelminski et al. | 74/470 |
| 3,388,821 | 6/1968 | White, Jr. | 414/715 |
| 3,446,502 | 5/1969 | Damron et al. | 74/479 X |
| 3,614,273 | 10/1971 | Wallace | 414/715 |
| 3,635,365 | 1/1972 | Bauer | 414/715 |
| 3,788,438 | 1/1974 | Reno | 74/501.5 R X |

*Primary Examiner*—C. J. Husar
*Assistant Examiner*—Moshe I. Cohen
*Attorney, Agent, or Firm*—Arthur J. Hansmann

[57] ABSTRACT

A fluid pump control for a tractor having a fluid pump controlled by an operator's handle connected to the pump by force-responsive members which do not transmit the pump vibration to the handle. The control is for a tractor transmission driven through a variable displacement pump which inherently develops vibrations. The handle is a pivotally mounted lever and the connections between the handle and the pump are four cables, and two intervening compression springs, all for transmitting the force on the lever to the pump while avoiding transmitting the pump vibrations back to the lever. The springs also are arranged with the cables to automatically return the pump to a neutral position when the operator releases hand force on the lever.

5 Claims, 4 Drawing Figures

FLUID PUMP CONTROL SYSTEM FOR A TRACTOR

This is a continuation of application Ser. No. 860,151, filed Dec. 14, 1977, and now abandoned.

This invention relates to a fluid pump control for a tractor, and, more particularly, it relates to a control for a tractor transmission which is powered by a variable displacement pump which inherently develops vibrations.

BACKGROUND OF THE INVENTION

The prior art is aware of arrangements of controls for pumps which are used to drive various motor mechanisms or the like, such as a fluid pump used to drive a tractor transmission or mobile equipment. In those prior art arrangements, operator levers or controls are connected with the pump and maneuver the operating elements of the pump for producing the desired fluid forces, such as driving a transmission. In those arrangements, the pump develops vibrations which are transmitted back to the operator's handle or lever, and this of course is undesirable in that it is detrimental to the apparatus itself and it is also fatiguing to the operator, and thus ineffective and inefficient operations are likely to occur.

Accordingly, the prior art is aware of examples of hydrostatic drive systems, such as those which are used to drive skid-steer loaders employing variable displacement fluid pumps having a fixed displacement motor. Control of the variable displacement pumps is generally by means of linkage systems, and these systems should be arranged to provide an automatic return to a neutral position, upon the operator's release of the handle or control, and these prior art systems are usually cumbersome and necessarily complicated and involved in design and they transmit the dither or vibration through the linkage system and back to the operator's handle. The dither is high frequency and low amplitude force that is generated when the pump is operating, such as the axial piston-type pump which is employed in certain installations. The constant pounding caused by the dither effect can cause premature failure of the controls and its linkage system as well as causing operator fatigue and consequent inefficiencies.

Specific examples of prior art tractors with bucket loaders are found in U.S. Pat. Nos. 3,388,821 and 3,614,273 and 3,635,365. In those examples, the first patent shows a relatively complicated lever system for controlling valves utilized in the drive of the tractor and in the operation of the loader bucket. The second patent also shows operator controls for the fluid equipment employed; and the third patent shows operator levers which control a piston type of fluid pump which supplies fluid to a motor connected to the tractor transmission or drive mechanism. In those examples, the operator handle or lever is connected to the fluid apparatus by means of rigid types of links or the like which therefore convey the undesirable dither from the fluid apparatus to the operator's handle.

Accordingly, the present invention provides for an improvement upon the prior art arrangements and does so by avoiding the problems and undesirable features mentioned above. Specifically, the present invention provides a fluid pump control which avoids transmitting the vibrations or dither and which returns the pump to the neutral position when the operator releases the handle.

Still further, the present invention accomplishes the aforesaid objectives and it does so with control apparatus which is simple in structure but yet effective and reliable in operation and which will always create a uniform type of controlled action and will firmly and reliably return the equipment to a neutral position when the operator has released the handle.

Still further, the present invention provides the fluid control apparatus as aforesaid and it does so with equipment which is self-regulating in the amount of force or movement transmittable between the control handle and the pump or apparatus itself, but yet the apparatus is proportionately controlled and positively controlled by the handle. That is, the operator cannot force excessively on the pump or like apparatus by maneuvering the handle, and the connections between the handle and the pump give a positive type of control but limit the degree of movement therebetween and thus avoid damage to the apparatus. Therefore, the present control avoids the possibility of the operator placing excessive force on the pump itself and thus overloading the pump, such as for instance when the operator's lever or handle is moved to an extreme position. As such, the present invention has automatic compensation or limitation to avoid overloading the fluid pump or fluid apparatus.

Other objects and advantages will become apparent upon reading the following description in light of the accompanying drawings.

DETAILED DESCRIPTION OF THE PREFERRED EMBODIMENT

Figure 1:
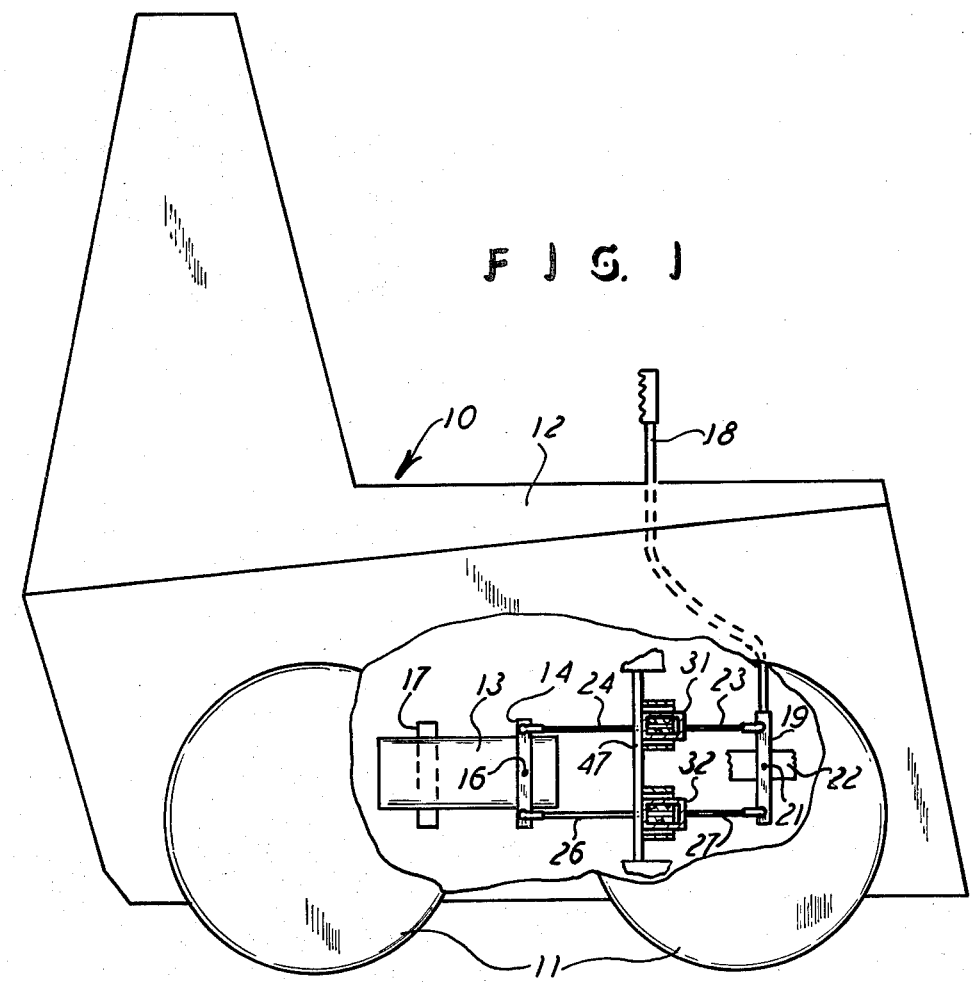
FIG. 1 is a side elevational view of a tractor having the fluid equipment and control of this invention shown thereon in a breakaway segment of the tractor.

FIG. 1 shows a conventional type of tractor 10 which is preferrably the uni-loader type which would have a loader bucket attached to it and which of course is mobile and supports an operator. Thus, ground-engaging wheels 11 are a part of the tractor which has a chassis or body 12, all in a conventional arrangement. As is commonly the case, the tractor has its engine driving fluid apparatus, such as hydraulic pumps and motors, for mobilizing the tractor and for operating the equipment, such as the loader bucket supported on the tractor. Accordingly, the tractor is of a conventional arrangement which will be readily understood by anyone skilled in the art, and it may be in the nature of the tractor shown in U.S. Pat. No. 3,635,365, including the arrangement of the control levers and the piston type of fluid pump controlled by the levers, as shown in said patent.

Accordingly, the present disclosure shows a fluid type of pump 13 which is of a conventional nature and which has a control member 14 mounted thereon and pivotal about a pin 16, all for controlling the pump 13 which is supported in the tractor in a conventional way and has the usual pintle member 17. Thus, movement of the control member 14 will position the pump 13 in various operating positions, and the pump 13 can be connected to a driven motor which may be a part of the tractor transmission or the like. The pump 13 can therefore be a variable or fixed displacement pump which can be respectively drivingly connected to a fixed or variable displacement motor which is not shown but which may be as shown in the referenced patent and which is in an arrangement well known to those skilled in the art.

This invention relates to the control for the fluid pump 13, and it is shown to include the operator's handle 18 which is connected to and is actually a part of a lever 19 pivoted on a pin 21 on a fixed member 22 of the tractor 10. Thus, the operator can maneuver the handle 18 and thereby pivot the member 19 and thus control the setting of the pump 13 for controlling the output of the pump, all as desired and in a substantially conventional nature which will be understood by one skilled in the art. The control apparatus of this invention further includes interconnecting members between the control member or lever 19 and the pump member 14. Those interconnecting members generally include four flexible cables 23, 24, 26, and 27 and it includes two compression springs 28 and 29.

Springs 28 and 29 are disposed within enclosed members 31 and 32, respectively which are elongated members having end walls 33 and 34 and side wall 36, all for containing the respective springs 28 and 29. The springs 28 and 29 are under preload or compression in the respective containers 31 and 32, though compression in addition to the preload can be applied to the springs, at least from their position in FIG. 2 which is a neutral position for the apparatus being described.

The four cables described are respectively connected with the two springs, such as by having the ends of cables 23 and 27 attached to the respective container 31 and 32 at the cable ends designated 37 and 38, respectively. Also, each container 31 and 32 has an abutment or piston member 39 and 41, respectively, movably disposed therein, and the cables 24 and 26 have their ends 42 and 43 attached respectively to the pistons 39 and 41, as shown in the drawings. The containers 31 and 32 are free to move along their longitudinal axes, such as shown between FIGS. 2 and 3 with regard to the container 31 and between FIGS. 2 and 4 with regard to the container 32. Enclosure guides 44 and 46 are shown fixed on the tractor frame member 47, acting as a fixed stop for springs 28 and 29 and the guides 44 and 46 may be longitudinally shaped to be extending adjacent the respective enclosures 31 and 32 for guiding the enclosures in the movement just described and thus restrain them from movement in the up-and-down direction as shown while permitting the horizontal movement as shown. The outer ends of the four cables are pivotally attached to the respective members 14 and 19 by means of threadedly adjustable eyelets 48 and pivot pins 49 so that the eyelets 48 can pivot relative to the control members 14 and 19 as shown in the FIGS. 2, 3, and 4 and for the purpose indicated therein. Therefore, the tension, slack, and the like can be controlled in the four cables and relative to the two springs 28 and 29, all by simply adjusting the threaded ends 51 on each of the four cables and thus altering the overall length of the four flexible cables or link members connecting the two levers 14 and 19 through the two springs 28 and 29, as shown.

Figure 2:
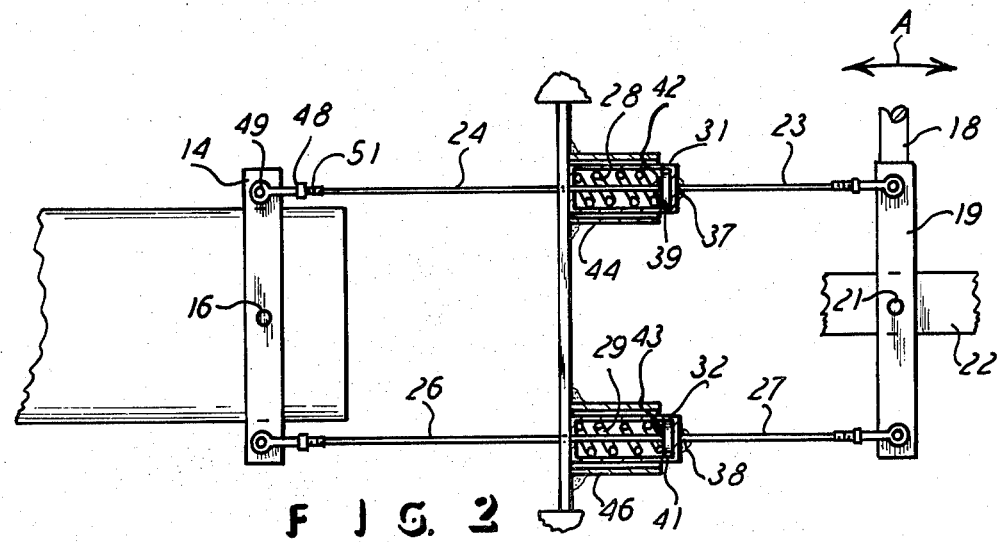
FIGS. 2 through 4 are views of the control apparatus of this invention in different operating positions.

With FIG. 2 showing a neutral position for the apparatus and thus for the hydraulic or fluid pump 13, it will be seen and understood that movement of the lever 19 about its pivot 21 in either direction indicated by the arrow A will cause corresponding movement of the lever 14 and thus the desired control of the output pump 13. For instance, if the operator maneuvers the handle 18 to move the lever 19 in a clockwise direction and thus to the FIG. 3 position, then tension in the cables 23 and 24 and compression in the intervening spring 28 will cause a corresponding movement of the lever 14 and thus the control and action of the pump 13, all as desired. In that action, the enclosed container 31 has moved to the right in FIG. 3 and the spring 28 has been compressed to the extent that the piston or abutment 39 has moved away from the container end wall 34. Therefore, the cables 23 and 24 are in essence separated from each other and the only socalled connection therebetween is through the spring 28 which can at least act as a dampening spring for the vibrations or dither which the pump 13 will create when it's in the three operating positions, in the usual manner of operation for the pump 13. However, because of the arrangement for the controls as described, the dither will not be transmitted back to the lever 19 and to the operator's handle 18. In that FIG. 3 position, the cable 27 can become slack, and the cable 26 will have tension therein and will also somewhat compress the spring 29 but there will be no transmitting of the dither or vibration from the pump 13 to the cables 26 and 27 to the lever 19. In the FIG. 3 position, this is the forward mode for the pump 13, relative to the forward drive of the tractor 10, for instance. The fact that both of the cables 24 and 26 are under tension results in a positive control of the pump member or lever 14 in that the cables 24 and 26 are both exerting a force to the right on lever 14, and thus positively controlling the lever 14, but of course there is greater force in the cable 24 at least until the lever 14 reaches a static position.

Further, it will be seen and understood that when the operator releases the handle 18, the spring 29 will exert a force on the cable 26 and thus automatically and positively cause the lever 14 to return to its neutral position which can be the FIG. 2 position. Likewise, the spring 28 will exert its force on the enclosure wall 33, and the cable 24 will also be pulling on the piston member 39, all to cause the container 31 to return to its FIG. 2 position and thereby place the lever 19 in the FIG. 2 or neutral position.

Figure 3:
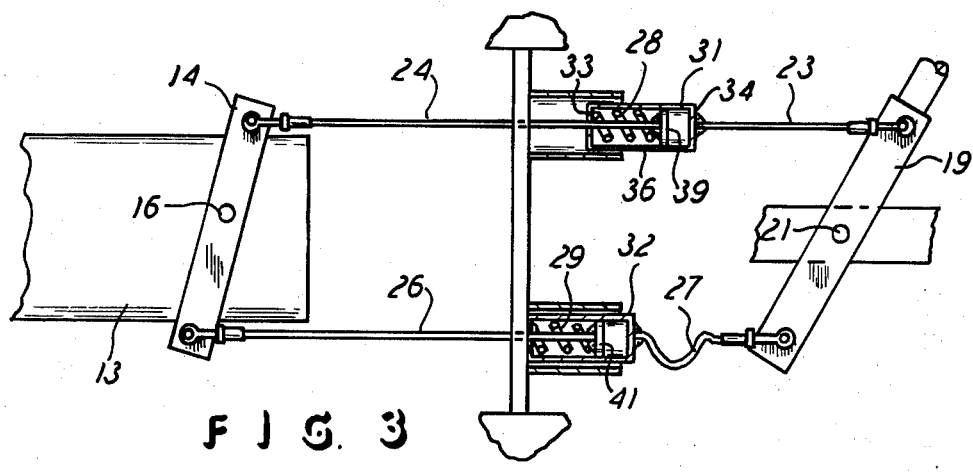
Figure 4:
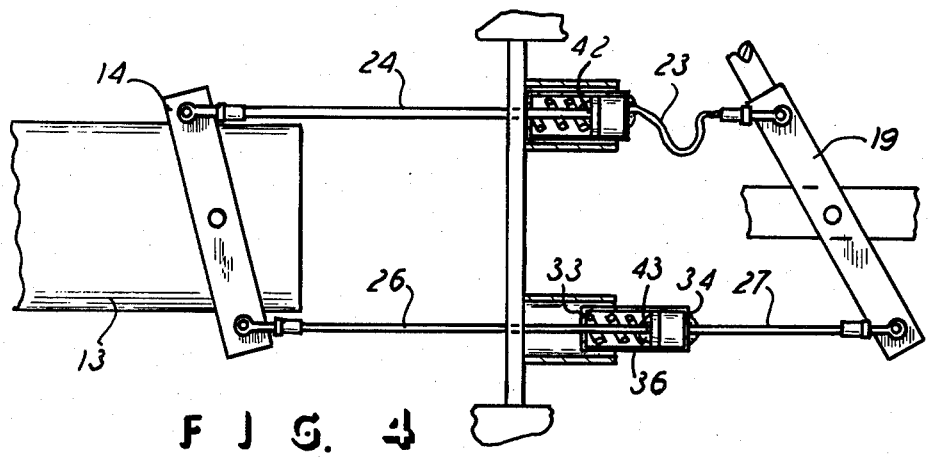

Next, considering moving the lever 19 in the counterclockwise direction, such as shown in FIG. 4, it will be seen that the lever 14 also is moved in the counterclockwise position, all by virtue of tension in the cables 26 and 27, along with some tension in the cable 24 for the positive control of the lever 14, as described in connection with FIG. 3. In that manner, the pump 13 can be placed in a reverse drive mode where the tractor 10 could be driven in reverse, for instance. Again, the vibration or dither from the pump 13 would not be translated back to the operator's handle 18, but the release of the handle 18 will cause the control apparatus to instantly and automatically return to the FIG. 2 neutral position from the FIG. 4 reverse position, all as desired.

As such, the present invention provides the control for a fluid pump or the like wherein there is the movably mounted control member 19 and the force-responsive member 14 for setting the pump 13 in selectable positions for operation. Further, there are the two compression springs 28 and 29 and the four connectors 23, 24, 26, and 27 which are associated with the respective springs at the effective opposite ends of the springs for transmitting the movement between the operator's control member 19 and the force-responsive member 14, all as described. The cables or flexible members are collapsible, as shown with the cable 27 in FIG. 3 and the cable 23 in FIG. 4, and in any operating position of the pump the springs 28 and 29 are further compressed and thereby cause physical separation between the respective cables and thus avoid the transmitting of the dither all as mentioned. Since the springs 28 and 29 are compression springs, the cables have their connecting ends actually effectively at the far ends of the springs 28 and 29, such that the cable 24 makes its point of connection with the spring 28 through the container 31 but at the container wall 33, for instance.

What is claimed is:

1. A fluid pump control for a tractor having a controlled fluid pump, comprising a pivotally mounted control member maneuverable by the operator, a force-responsive member pivotally mounted and operatively associable with said pump for setting said pump in variable selectable positions of operation including a neutral position, each of said members having two oppositely extending movable ends, two compression springs disposed intermediate said members to have one spring respectively intermediate each respective two of said movable ends, four connectors spearately operatively associated between respective ones of the four of said movable ends and respective ones of said springs at effective opposite ends of each of said springs for transmitting movement of said members toward each other only through said springs, a fixed stop disposed off one end of each of said springs for limiting movement of each of said springs beyond said one stop, a movable abutment disposed at the other end of each of said springs to operatively relate with said springs and being freely movable relative to each other, said springs being disposed between said stop and abutment and being the only elements between said stop and abutment to yieldingly urge said abutment away from said stop, each said abutment being respectively connected with said connectors to have said springs apply force on said two connectors connected with said force-responsive member operatively associated with said pump and thereby position the latter said member in one of said variable selectable positions and later return to a pump neutral position after release of the control member.

2. The fluid pump control for a tractor having a controlled fluid pump as claimed in claim 1, including a container enclosing each of said springs and presenting an end wall to form abutments for said springs, and said movable abutments being pistons freely slidable in each of said containers and disposed in abutment with a respective one end of each of said springs which are the only elements for holding said abutments apart, and said four connectors being respectively connected to said containers and to said pistons, all for transmitting forces between said connectors through a respective one of said springs.

3. The fluid pump control for a tractor having a controlled fluid pump as claimed in claim 1, wherein said connectors are arranged to be of effective variable length between their associations with said movable ends and said springs.

4. The fluid pump control for a tractor having a controlled fluid pump as claimed in claim 1, wherein said connectors are flexible members arranged to be collapsible to thereby be of effective variable lengths between their associations with said movable ends and said springs.

5. The fluid pump control for a tractor having a controlled fluid pump as claimed in claim 4, wherein said connectors are flexible cables.

* * * * *